(12) United States Patent
Best et al.

(10) Patent No.: US 10,913,552 B2
(45) Date of Patent: Feb. 9, 2021

(54) STAND-OFF PANEL THERMAL PROTECTION SYSTEM AND METHOD OF FABRICATING THE SAME

(71) Applicant: The Boeing Company, Chicago, IL (US)

(72) Inventors: Michael J. Best, Huntington Beach, CA (US); Thomas R. Pinney, Long Beach, CA (US); Jonathan D. Embler, Tustin, CA (US)

( * ) Notice: Subject to any disclaimer, the term of this patent is extended or adjusted under 35 U.S.C. 154(b) by 0 days.

(21) Appl. No.: 15/803,625

(22) Filed: Nov. 3, 2017

(65) Prior Publication Data

US 2018/0057192 A1 Mar. 1, 2018

Related U.S. Application Data

(63) Continuation of application No. 14/738,314, filed on Jun. 12, 2015, now Pat. No. 9,878,809.

(51) Int. Cl.
*B64G 1/58* (2006.01)
*F16B 33/00* (2006.01)
(Continued)

(52) U.S. Cl.
CPC ............... *B64G 1/58* (2013.01); *B64G 1/14* (2013.01); *B64G 1/62* (2013.01); *F16B 33/006* (2013.01)

(58) Field of Classification Search
CPC .................................................. F16B 33/006
See application file for complete search history.

(56) References Cited

U.S. PATENT DOCUMENTS 490,553 A * 1/1893 Grafflin, Jr. ............. F16B 39/10
411/120
2,151,919 A * 3/1939 Jacobson ................ F16B 39/26
411/132
(Continued)

FOREIGN PATENT DOCUMENTS

CN 201163163 Y 12/2008
CN 202081567 U 12/2011
(Continued)

OTHER PUBLICATIONS

NPL www.extreme-bolt.com/products-ceramic-bolts.html#Properties, 2019.*

(Continued)

*Primary Examiner* — Richard G Davis
(74) *Attorney, Agent, or Firm* — MH2 Technology Law Group LLP (57) ABSTRACT

A stand-off panel thermal protection system is disclosed. The system comprises a sandwich panel comprising: a first ceramic matrix composite facesheet and a second ceramic matrix composite facesheet. A ceramic matrix composite core is positioned between the first ceramic matrix composite facesheet and the second ceramic matrix composite facesheet. The ceramic matrix composite core has a perimeter. The first ceramic matrix composite facesheet and the second ceramic matrix composite facesheet extend past the perimeter to form a gap between the first ceramic matrix composite facesheet and the second ceramic matrix composite facesheet surrounding the ceramic matrix composite core. A plurality of orifices are formed through the sandwich panel. The thermal protection system further comprises a soft goods seal positioned in the gap; a plurality of insulation components; a plurality of stand-off brackets; and a plurality (Continued)

of fasteners positionable through the plurality of orifices to couple the sandwich panel to the plurality of brackets.

20 Claims, 5 Drawing Sheets (51) Int. Cl.
*B64G 1/14* (2006.01)
*B64G 1/62* (2006.01)

(56) References Cited

U.S. PATENT DOCUMENTS

| | | | | |
|---|---|---|---|---|
| 2,154,655 | A * | 4/1939 | Bahan | D03D 49/38 |
| | | | | 411/352 |
| 3,648,749 | A * | 3/1972 | Warren | F16B 39/10 |
| | | | | 411/87 |
| 3,783,922 | A * | 1/1974 | Petrus | F16B 37/044 |
| | | | | 411/111 |
| 4,543,345 | A * | 9/1985 | Wei | C04B 35/563 |
| | | | | 264/125 |
| 4,804,571 | A | 2/1989 | Jouffreau | |
| 4,906,150 | A * | 3/1990 | Bennett | F16B 39/10 |
| | | | | 411/119 |
| 4,925,134 | A * | 5/1990 | Keller | B64C 1/38 |
| | | | | 244/117 A |
| 4,938,644 | A * | 7/1990 | Runels | F16B 39/10 |
| | | | | 411/132 |
| 4,975,014 | A | 12/1990 | Ruffin et al. | |
| 5,279,191 | A | 1/1994 | Buljan | |
| 5,405,227 | A * | 4/1995 | His | C04B 35/806 |
| | | | | 411/366.3 |
| 6,027,293 | A * | 2/2000 | Beemer | F16B 37/044 |
| | | | | 411/112 |
| H001981 | H * | 8/2001 | Hennick | 411/102 |
| 6,293,496 | B1 * | 9/2001 | Moe | B64G 1/58 |
| | | | | 244/119 |
| 7,037,065 | B2 * | 5/2006 | Reigl | F01D 25/243 |
| | | | | 415/47 |
| 8,752,350 | B2 * | 6/2014 | Pinney | B64G 1/58 |
| | | | | 428/137 |
| 9,079,674 | B1 * | 7/2015 | Grillos | B64G 1/58 |
| 9,447,811 | B2 * | 9/2016 | Stewart | F16B 37/065 |
| 2002/0085896 | A1 * | 7/2002 | Werner | F16B 39/08 |
| | | | | 411/366.1 |
| 2004/0091736 | A1 | 5/2004 | Dichiara | |
| 2006/0137294 | A1 * | 6/2006 | Waits, Jr. | F16B 5/01 |
| | | | | 52/787.1 |
| 2009/0095443 | A1 * | 4/2009 | Connelly | B64D 33/04 |
| | | | | 165/51 |
| 2010/0095626 | A1 * | 4/2010 | Embler | B64C 1/40 |
| | | | | 52/506.05 |
| 2012/0275845 | A1 | 11/2012 | Etling | |
| 2012/0301680 | A1 | 11/2012 | To | |
| 2016/0265857 | A1 | 9/2016 | Benthem | |

FOREIGN PATENT DOCUMENTS

| | | |
|---|---|---|
| EP | 0214893 A1 | 3/1987 |
| FR | 2586246 A1 | 2/1987 |
| FR | 2610921 A1 | 8/1988 |
| FR | 2945792 A1 | 11/2010 |
| WO | 03045684 A1 | 6/2003 |

OTHER PUBLICATIONS

English translation of First Notification of Office Action dated Aug. 1, 2018 in corresponding Chinese Application No. 201610333388.6.

Extended European Search Report for EP Appl. No. 16173036.1 dated Nov. 7, 2016.

Aerothermal Test of Metallic Tps for X-33 Reusable Launch Vehicle.

DARPA: Metallic Termal Protection Ssytem Enhancements for Orbital and Sub-Orbital Flight Environments. Jun. 27, 2007.

Bouslog et al., "X-33 Metallic TPS Tests in NASA-LARC High Temperature Tunnel", 37th AIAA Aerospace Sciences Meeting and Exhibit, Reno, NV, Jan. 11-14, 1999, pp. 1-16.

Myers, et al., "Parametric Weight Comparison of Advanced Metallic, Ceramic Tile, and Ceramic Blanket Thermal Protection Systems", National Aeronautics and Space Administration, Langley Research Center, NASA/TM-2000-210289, Jun. 2000, pp. 1-49.

Sawyer et al., "Aerothermal Test of Metallic TPS for X-33 Reusable Launch Vehicle", NASA Langley Research Center/B.F. Goodrich Aerospace, Jan. 1, 1998, pp. 1-7.

The SHEFEX Team, "SHEFEX II 2nd Flight within DLR's Re-Entry Technology and Flight Test Program", AIAA 2012 Tours, DLR, 2012, Feb. 26, 2013, pp. 1-56.

Weihs, et al., "SHEFEX 2 Mission Overview and Status", Deutsches Zentrum, DLR, Feb. 6, 2008, pp. 1-26.

Kelkar et al., "Formation of octadecyltrichlorosilane (OTS) self-assembled monolayers on amorphous alumina", Applied Surface Science, Oct. 2013, pp. 1-2.

Dennis Barber, "Metallic Thermal Protection System Development Status", National Space & Missiles Materials Symposium, Oceaneering Space Systems, Houston, TX, 2009, pp. 1-35.

M. Agrella, "Metallic Thermal Protection System Enhancements for Orbital and Sub-Orbital Flight Environments", National Space & Missiles Materials Symposium, Oceaneering Space Systems, Keystone, CO, Jun. 27, 2007, pp. 1-26.

Craig A. Stephens, "Overview of NASA's Hypersonic Air-Breathing Materials & Structures Discipline", 2012 Technical Conference, Cleveland, OH, Mar. 13-15, 2012, pp. 1-27.

Examination Report dated Mar. 13, 2020 in related corresponding European Application No. 17203721.0, 6 pages.

Böhrk et al., "Secure tightening of a CMC fastener for the heat shield of re-entry vehicles," Composite Structures 92 (2010) 107-112.

Mei et al., "High-temperature tensile properties and oxidation behavior of carbon fiber reinforced silicon carbide bolts in a simulated re-entry environment," Science Direct, Carbon 48 (2010) 3007-3013.

Extended European Search Report dated Apr. 18, 2018 in related European Application No. 17203721.0, 12 pages.

* cited by examiner

STAND-OFF PANEL THERMAL PROTECTION SYSTEM AND METHOD OF FABRICATING THE SAME

PRIORITY

This application is a continuation of U.S. application Ser. No. 14/738,314, filed on Jun. 12, 2015, now U.S. Pat. No. 9,878,809, issued on Jan. 30, 2018, the disclosure of which is incorporated herein by reference in its entirety.

FIELD OF THE DISCLOSURE

The present disclosure is directed to a stand-off panel thermal protection system for a vehicle and method of fabricating the system.

BACKGROUND

Re-usable launch vehicles and hypersonic vehicles employ thermal protection systems to protect the primary structure, fuel, and internal components from high thermal loads experienced in flight. Various architectures for thermal protection systems have been used in the past, including ablators, integrated hot structures, phase-change materials, and various other parasitic systems, including parasitic stand-off panel systems, bonded ceramic tiles, thermal blankets, and oxide CMC wrapped ceramic tiles.

Previous parasitic stand-off panel configurations have used superalloy metallic honeycomb panels or non-oxide laminate panels as the structural elements that constitute the exposed surface of the vehicle. The panels are typically attached to stand-off brackets with metallic fasteners, with the fasteners installed such that they are not exposed to the surface to avoid structural issues caused by exposure to high temperatures. This requires that access plugs or similar features be integrated in the panel, or requires that the gap between panels is large enough to provide sufficient access to install the fasteners. Sealing of panel to panel gaps has been previously accomplished with a hard composite or metallic seal, a ceramic cloth soft seal, or a combination of both. The seals are typically installed as separate parts, which can make vehicle integration of a full TPS panel array challenging. Further, superalloy metallic honeycomb stand-off panels have limited temperature capabilities, with peak temperature ranges of around 1500° F. This makes them not suitable for all acreage areas of a typical launch vehicle, which can experience temperatures up to 2400° F. or more.

Bonded TPS tiles, such as those applied on the space shuttle, have proven to be very costly to install and repair. Each tile is a custom part and takes a significant amount of time to install. Additionally, systems of this type require waterproofing between flights, which is time-consuming and expensive. Oxide CMC wrapped tiles also require waterproofing between flights to avoid increases in weight due to water absorption.

Non-oxide laminate stand-off panel designs proposed in the past do not have the structural efficiency to be competitive with alternate TPS solutions. Metallic honeycomb panels also tend to be heavy, which can be problematic in aircraft and other flight vehicle designs.

Thus, there is a need in the art for improved thermal protection systems and methods of installation of such thermal protection systems.

SUMMARY

The present disclosure is directed to a stand-off panel thermal protection system. The system comprises a sandwich panel comprising: a first ceramic matrix composite facesheet and a second ceramic matrix composite facesheet. A ceramic matrix composite core is positioned between the first ceramic matrix composite facesheet and the second ceramic matrix composite facesheet. The ceramic matrix composite core has a perimeter. The first ceramic matrix composite facesheet and the second ceramic matrix composite facesheet extend past the perimeter to form a gap between the first ceramic matrix composite facesheet and the second ceramic matrix composite facesheet surrounding the ceramic matrix composite core. A plurality of orifices are formed through the sandwich panel. The thermal protection system further comprises a soft goods seal positioned in the gap; a plurality of insulation components; a plurality of stand-off brackets; and a plurality of fasteners positionable through the plurality of orifices to couple the sandwich panel to the plurality of brackets.

The present disclosure is also directed to a method of assembling a stand-off panel thermal protection system. The method comprises attaching stand-off brackets to a base structure. A plurality of insulation components are positioned between and around the stand-off brackets. A sandwich panel is attached to the stand-off brackets with ceramic fasteners. The sandwich panel comprises a first ceramic matrix composite facesheet and a second ceramic matrix composite facesheet. A ceramic matrix composite core is positioned between the first ceramic matrix composite facesheet and the second ceramic matrix composite facesheet. The ceramic matrix composite core has a perimeter. The first ceramic matrix composite facesheet and the second ceramic matrix composite facesheet extend past the perimeter to form a gap surrounding the ceramic matrix composite core between the first ceramic matrix composite facesheet and the second ceramic matrix composite facesheet. A plurality of orifices are formed through the sandwich panel. A soft goods seal is positioned in the gap.

The present application is further directed to a flight vehicle. The flight vehicle comprises: a base structure; and a stand-off panel thermal protection system. The thermal protection system comprises a plurality of sandwich panels. Each sandwich panel comprises a first ceramic matrix composite facesheet and a second ceramic matrix composite facesheet. A ceramic matrix composite core is positioned between the first ceramic matrix composite facesheet and the second ceramic matrix composite facesheet. The ceramic matrix composite core has a perimeter. The first ceramic matrix composite facesheet and the second ceramic matrix composite facesheet extend past the perimeter to form a gap between the first ceramic matrix composite facesheet and the second ceramic matrix composite facesheet surrounding the ceramic matrix composite core. A plurality of orifices are formed through each sandwich panel. The thermal protection system further comprises a soft goods seal positioned in the gap of each sandwich panel. A plurality of insulation components are positioned between each sandwich panel and the base structure. A plurality of stand-off brackets are positioned between each sandwich panel and the base structure, the stand-off brackets being attached to the base structure. A plurality of fasteners are positioned through the plurality of orifices to couple each sandwich panel to the plurality of brackets.

The thermal protection system and method of the present disclosure can provide one or more of the following benefits: reduced maintenance and/or repair costs, increased damage tolerance, increased temperature capability, reduced weight, increased strength to weight ratio, increased structural efficiency, increased ease of installation, repeated use without the need for re-waterproofing, the ability to withstand high temperatures of up to 2400° F. while still providing sufficient strength and stiffness properties.

It is to be understood that both the foregoing general description and the following detailed description are exemplary and explanatory only and are not restrictive of the present teachings, as claimed.

BRIEF DESCRIPTION OF THE DRAWINGS

The accompanying drawings, which are incorporated in and constitute a part of this specification, illustrates aspects of the present teachings and together with the description, serve to explain the principles of the present teachings.

It should be noted that some details of the figures have been simplified and are drawn to facilitate understanding rather than to maintain strict structural accuracy, detail, and scale.

DESCRIPTION

Reference will now be made in detail to the present teachings, examples of which are illustrated in the accompanying drawings. In the drawings, like reference numerals have been used throughout to designate identical elements. In the following description, reference is made to the accompanying drawings that form a part thereof, and in which is shown by way of illustration specific examples of practicing the present teachings. The following description is, therefore, merely exemplary.

Figure 1:
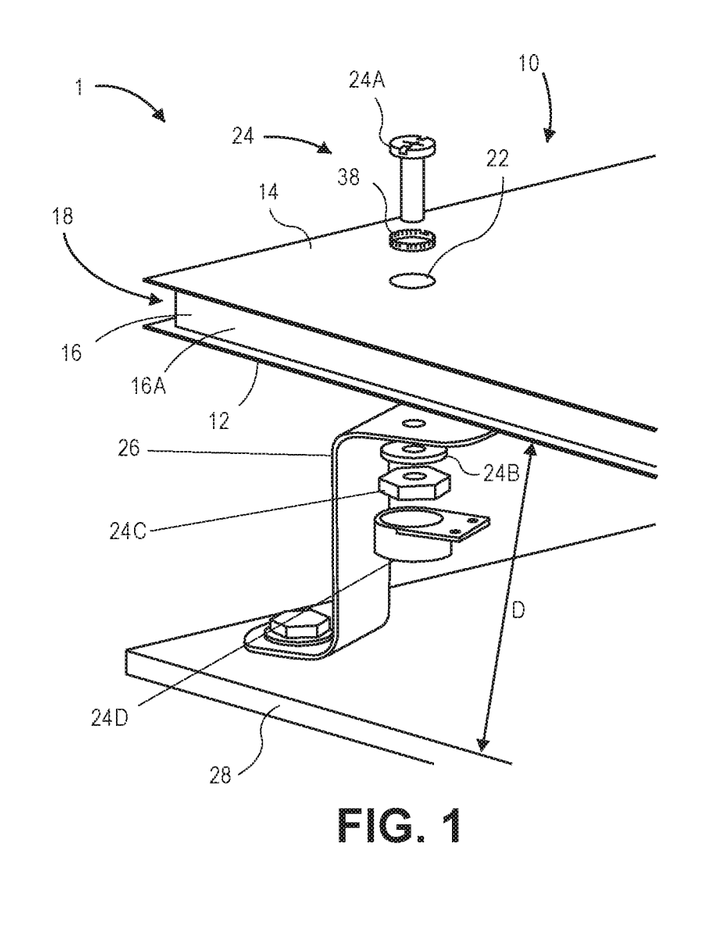
FIG. 1 illustrates a perspective view of a sandwich panel of a thermal protection system attached to base structure, including an exploded view of a fastener and bracket used to attach the sandwich panel to the base structure, according to an aspect of the present disclosure.
Figure 2:
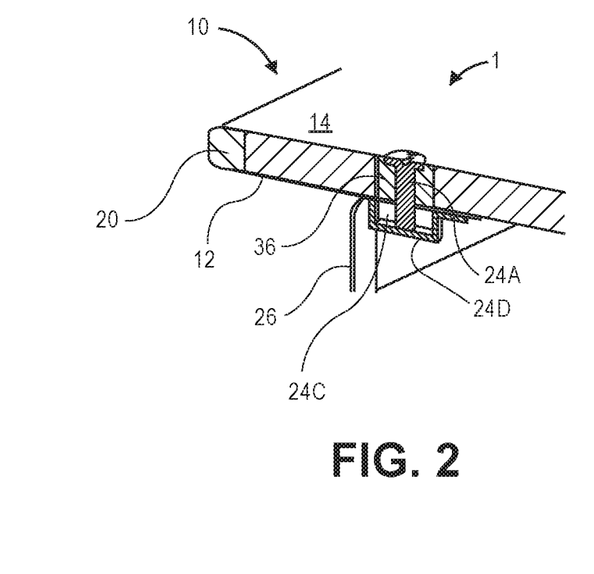
FIG. 2 illustrates a partial cross-sectional view of the sandwich panel and fastener of FIG. 1, including a pre-integrated soft goods seal positioned in a gap of the sandwich panel, according to an aspect of the present disclosure.
Figure 3A:
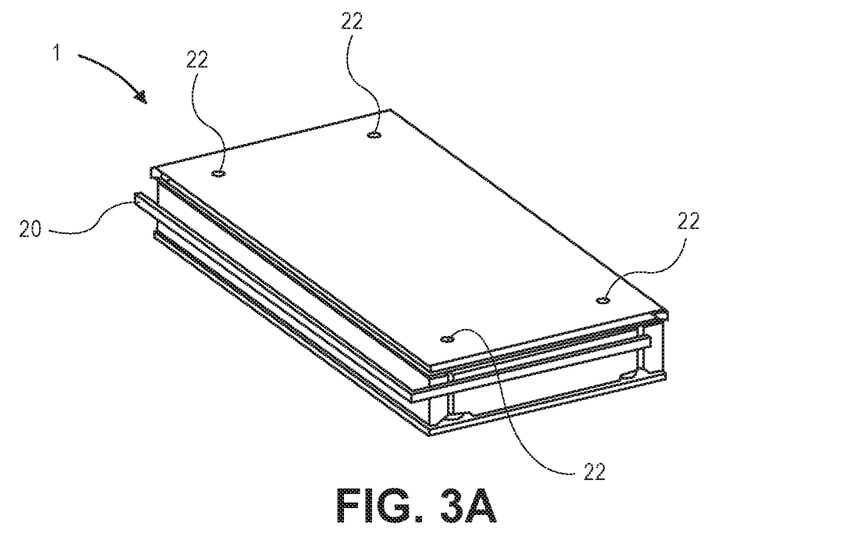
FIGS. 3A and 3B show perspective views of a sandwich panel with insulation components positioned between a sandwich panel and a base structure, including a view of a soft goods seal positioned out of a gap in FIG. 3A and a view of the soft goods seal positioned in the gap in FIG. 3B, according to an aspect of the present disclosure.
Figure 3B:
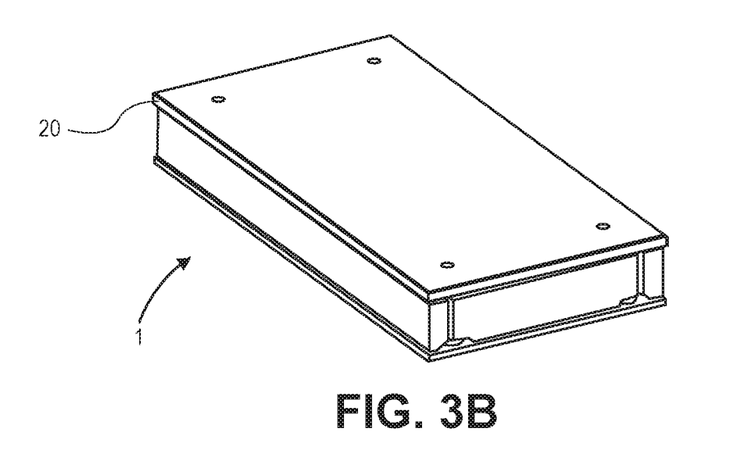

The present application is directed to a parasitic, stand-off panel thermal protection system ("TPS") 1, views of which are shown in FIGS. 1 to 7 of the present disclosure. Referring to FIG. 1, the TPS 1 comprises a plurality of sandwich panels 10. Each sandwich panel 10 comprises a first ceramic matrix composite facesheet 12 and a second ceramic matrix composite facesheet 14. A ceramic matrix composite core 16 is positioned between the first ceramic matrix composite facesheet 12 and the second ceramic matrix composite facesheet 14. The ceramic matrix composite core 16 shown in FIG. 1 has an exposed perimeter 16a. The first ceramic matrix composite facesheet 12 and the second ceramic matrix composite facesheet 14 extend past the perimeter 16a to form a gap 18 between the first ceramic matrix composite facesheet 12 and the second ceramic matrix composite facesheet 14. Gap 18 extends around the entire edge of the sandwich panel 10. A soft goods seal 20 is positioned in the gap as shown in FIGS. 2, 3A and 3B. The seal 20 extends around the entire perimeter of the sandwich panel 10.

The first ceramic matrix composite facesheet 12 and the second ceramic matrix composite facesheet 14 can comprise any suitable oxide ceramic matrix composite or non-oxide ceramic matrix composite material. Suitable oxide ceramic matrix composite or non-oxide ceramic matrix composite materials are well known in the art. In an embodiment, the materials are non-oxide matrix composite materials comprising silicon carbide fibers, carbon fibers or both, within a silicon carbide matrix. The ceramic matrix composite core 16 also comprises any suitable oxide ceramic matrix composite or non-oxide ceramic matrix composite material. This can also be, for example, composite materials comprising silicon carbide fibers, carbon fibers or both, within a silicon carbide matrix. The ceramic matrix composite material for the facesheets and the core can be the same type of material (e.g., both oxide CMC or both non-oxide CMC) or a different type of material.

In one example, the sandwich panel 10, including the facesheets and ceramic matrix composite core, is in the form of a C/SiC (e.g., carbon fibers in a silicon carbide matrix) or SiC/SiC (e.g., silicon carbide fibers in a silicon carbide matrix) truss core panel. Such panels can provide increased structural efficiency and temperature capability compared to alternate stand-off panel designs. Examples of such panels are known in the art.

The soft goods seal 20 comprises at least one material chosen from alumina, silica, carbon fibers or silicon carbide fibers woven into a desired seal structure. Suitable soft goods seals are generally well known in the art. Examples of such seals include a NEXTEL™ woven soft goods seal sock, which comprises a woven ceramic fabric filled with alumina fibrous batting insulation. The soft goods seal 20 is capable of withstanding high temperatures of, for example, 2400° F., while preventing or reducing plasma flow to areas beneath the seal. Soft goods seal 20 also has enough compliance to deform as the panels undergo thermal expansion. Soft goods seal 20 can be pre-integrated into the gap 18 in any suitable manner prior to assembly of the thermal protection system. For example, the soft goods seal can be sewn into position in the gap 18, or held in position by compression fit.

The sandwich panels 10 can be fastened to any desired base structure using a fastening system suitable for high temperature applications. Referring to FIGS. 1 and 7E, a plurality of fasteners 24 are positionable through a plurality of orifices 22 formed through the sandwich panel to couple the sandwich panel 10 to a plurality of stand-off brackets 26. The stand-off brackets 26 are positioned between each sandwich panel 10 and a base structure 28 to which the TPS is to be attached. For example, the stand-off brackets 26 can be attached to the base structure 28; and the plurality of fasteners 24 can be positioned through the plurality of orifices 22 to couple each sandwich panel 10 to the plurality of brackets 26. In this manner, the stand-off brackets 26 can be used to couple the sandwich panels 10 to a base structure 28 so that the sandwich panels 10 are spaced from the base structure by a desired distance, D.

Any suitable fasteners 24 can be employed, one example of which includes a bolt 24A, washer 24B, nut 24C and nut retainer 24D, as illustrated in FIG. 1. The nut retainer 24D functions to hold the nuts in place during assembly of the thermal protection system. Nut retainer 24D can be held in position in any suitable manner, such as by attaching nut retainer 24D to the standoff bracket 26.

The plurality of fasteners 24 and standoff brackets 26 can be made of any suitable high temperature materials capable of provide the desired structural support for maintaining the sandwich panels 10 in position on the base structure 28. Suitable materials include ceramics, such as alumina, and high temperature metallic material. The ceramic fastener materials can be selected so as to be capable of withstanding extreme environments without the need for panel plugs or other features to protect the fasteners. For example, the materials can be capable of withstanding high temperatures experienced by a flight vehicle upon reentry into earth's atmosphere and/or at hypersonic speeds without significant degradation in properties or excessive thermal expansion. In one example, the fasteners 24A, 24B, 24C and the standoff brackets 26 comprise a ceramic material, such as alumina, and the nut retainer 24D is made of a high temperature metal (as described below). One example of a ceramic material that can be used for the fasteners 24A, 24B and 24C is WG-300 produced by Greeenleaf, which is a whisker-reinforced alumina ceramic matrix composite. The nut retainer can be made of any suitable high temperature metal, such as HAYNES 282 produced by Haynes International, which is a nickel superalloy metallic material.

As shown in FIG. 2, a reinforcing ceramic matrix composite insert 36 can be positioned to surround each of the plurality of orifices in the sandwich panel 10 so as to reinforce the orifice 22, react loads and/or distribute loads to the facesheets 12,14. Generally speaking, reinforcing inserts are known for use in low temperature polymer matrix composites. However, reinforcing inserts are not known for use with the ceramic matrix composites employed in the sandwich panels 10 of the present disclosure. The reinforcing inserts provide the reinforcement described above, which allows the fasteners 24 to hold the sandwich panels 10 in position while providing for easy access to the fasteners and still allowing for a relatively smooth outer surface due to the fasteners 24 being positioned flush with the outer surface of sandwich panel 10, as described below. The reinforcing ceramic inserts 36 comprise, for example, ceramic fiber (e.g., silicon carbide fiber or carbon fiber) in the form of ceramic matrix composite ("CMC") material that can provide the desired reinforcing properties. In an example, the ceramic insert 36 can be made of the same material as the ceramic matrix composite core, and can be co-cured, or laid up, in the panel core. By the term "laid up" is meant that during the process for producing composite parts, the insert can be fabricated as a part of the panel during the same fabrication process, as opposed to being mechanically installed at a separate time. In an example, the insert 36 can be a two dimensional (2D) or three dimensional (3D) laminate. The ceramic insert 36 can have any suitable shape or size that will provide the desired reinforcement of the orifices 22. For example, the insert 36 can have a cylindrical, or "puck", shape with a diameter ranging from about 1 to about 5 inches, such as about 2 to about 3 inches. The insert can be shaped to accept the fastener such that the fastener is flush on the outermost surface of the thermal protection system, as shown in FIG. 4B.

Figure 4A:
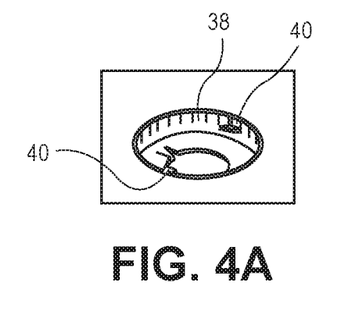
FIG. 4A shows a cup washer fastener locking mechanism positioned to surround an orifice in the sandwich panel of FIG. 1, according to an aspect of the present disclosure.
Figure 4B:
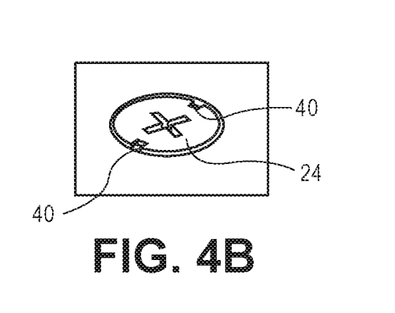
FIG. 4B shows the fastener of FIG. 1 positioned flush on the outermost surface of the thermal protection system with the cup washer locking mechanism engaged, according to an aspect of the present disclosure.

Referring to FIG. 4A, a cup washer locking mechanism 38 can be positioned to surround each of the plurality of orifices in the sandwich panel. The cup washer locking mechanism can include tabs 40 that fold into grooves on the head of fastener 24A, as shown in FIG. 4B. This can prevent the fasteners from rotating and thereby becoming loose in the orifices 22. Such cup washer locking mechanisms are generally known in the art.

Figure 5:
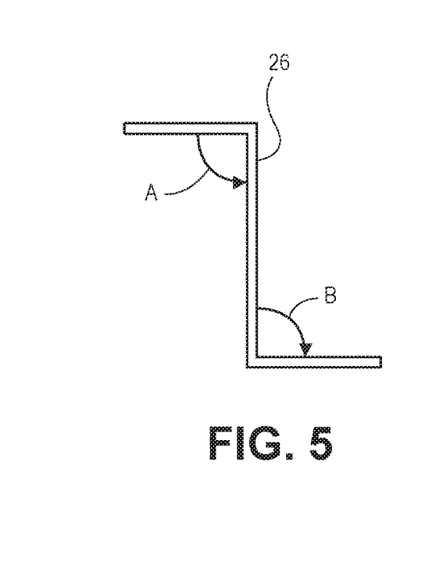
FIG. 5 shows a schematic sideview of a standoff bracket, according to an aspect of the present disclosure.

The standoff brackets 26 can be designed to flex to accommodate thermal expansion of the panels while maintaining sufficient strength and stiffness to react the high loads experience during launch and in flight. The standoff brackets 26 can be positioned in any desired manner. However, orienting the standoff brackets 26 similarly as shown in FIG. 1, so that panel thermal expansion has a tendency to bend the brackets to reduce angles A and B, as shown in FIG. 5, can reduce the possibility of interlaminar tension failure of the standoff brackets.

Figure 6A:
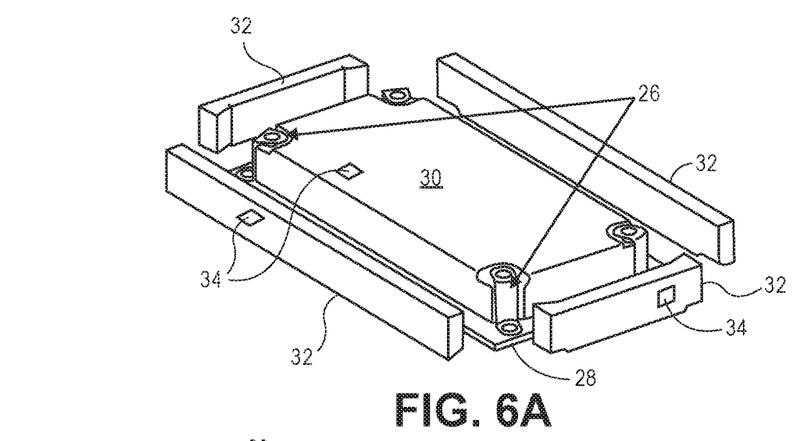
FIGS. 6A and 6B show a plurality of insulation components positioned around standoff brackets between each sandwich panel and a base structure, according to an aspect of the present disclosure.
Figure 6B:
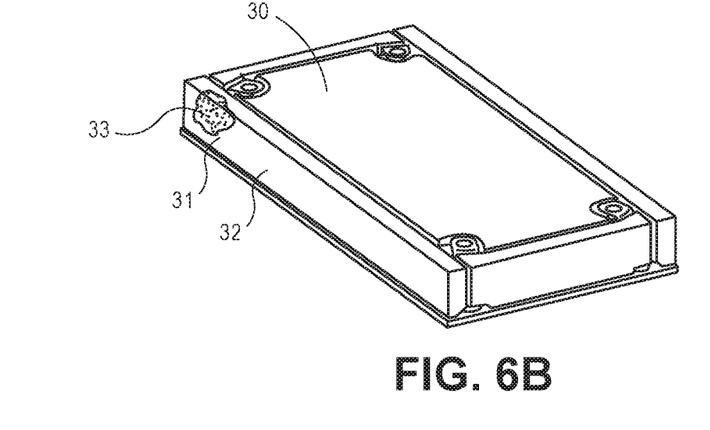

Referring to FIGS. 6A and 6B, a plurality of insulation components 30,32 can be positioned around the standoff brackets 26 between each sandwich panel 10 and the base structure 28. Insulation components 30,32 can be positioned in thermal communication with the facesheet 12. The insulation components can absorb heat and reduce the temperature increase of the base structure 28 caused by a thermal event, thereby providing desired thermal protection.

Any suitable insulating components that are resistant to water absorption and that can withstand high temperatures while providing the desired insulation properties can be employed. As an example, each of the insulation components 30,32 comprises a water resistant bag 31 filled with insulation material 33. The water resistant bag can comprise a metal foil, such as a superalloy capable of withstanding extreme temperatures. One example of such a metal material is INCONEL® foil, which is a superalloy comprising nickel, chromium, austenite and one or more other ingredients. The bags can have one or more vents 34 to reduce and/or prevent pressurization. The insulating material 33 in the bags can be a relatively low density insulation, for example, a batting having a density of about 1 pound to about 10 pounds per cubic foot, such as about 3 to about 6 pounds per cubic foot (pcf). While five insulating components are illustrated in FIG. 6A, any suitable number of insulating components can be employed depending on the size and shape of both the sandwich panel 10 and of the insulating components themselves.

Figures 7A, 7B, 7C:
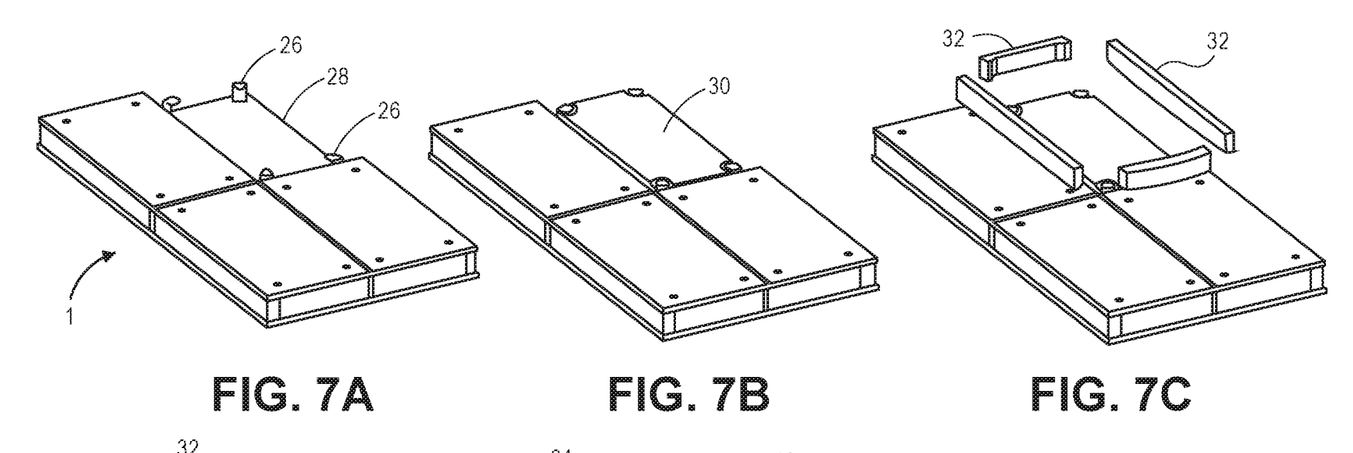
FIGS. 7A to 7F illustrate a method of assembling a stand-off panel thermal protection system, according to an aspect of the present disclosure.
Figures 7D, 7E, 7F:
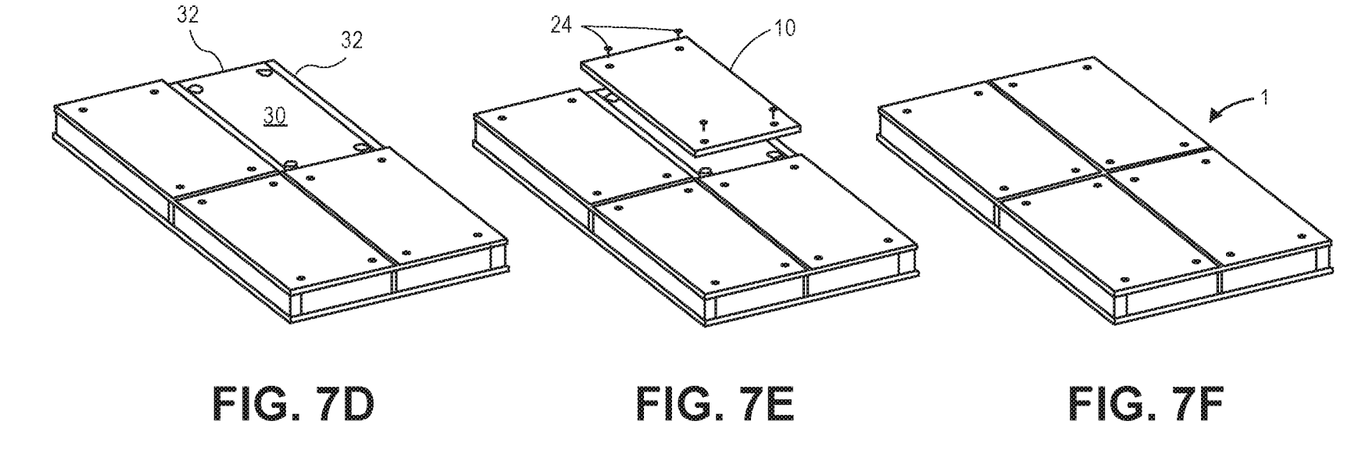

Referring to FIGS. 7A to 7F, the present application is also directed to a method of assembling a stand-off panel thermal protection system. The method comprises attaching stand-off brackets 26 to a base structure 28, as shown in FIG. 7A. A plurality of insulation components 30,32 are positioned between and around the stand-off brackets 26, as shown in FIGS. 7B, 7C and 7D. A sandwich panel 10 is attached to the stand-off brackets 26 with fasteners 24, as shown in FIG. 7E, with the soft goods seal 20 positioned in the gap 18, as is described above and shown with respect to FIGS. 3A and 3B. Any of the sandwich panels 10 described herein can be employed in the method of the present disclosure. The fasteners 24 can be tightened and then locked in place using the cup washer locking mechanism 38, as described above. Once completed, the full thermal protection system comprises an array of sandwich panels 10, as shown for example in FIG. 7F, attached to the base structure 28 of, for example, a flight vehicle, so as to form an outer surface thereof.

Figure 8:
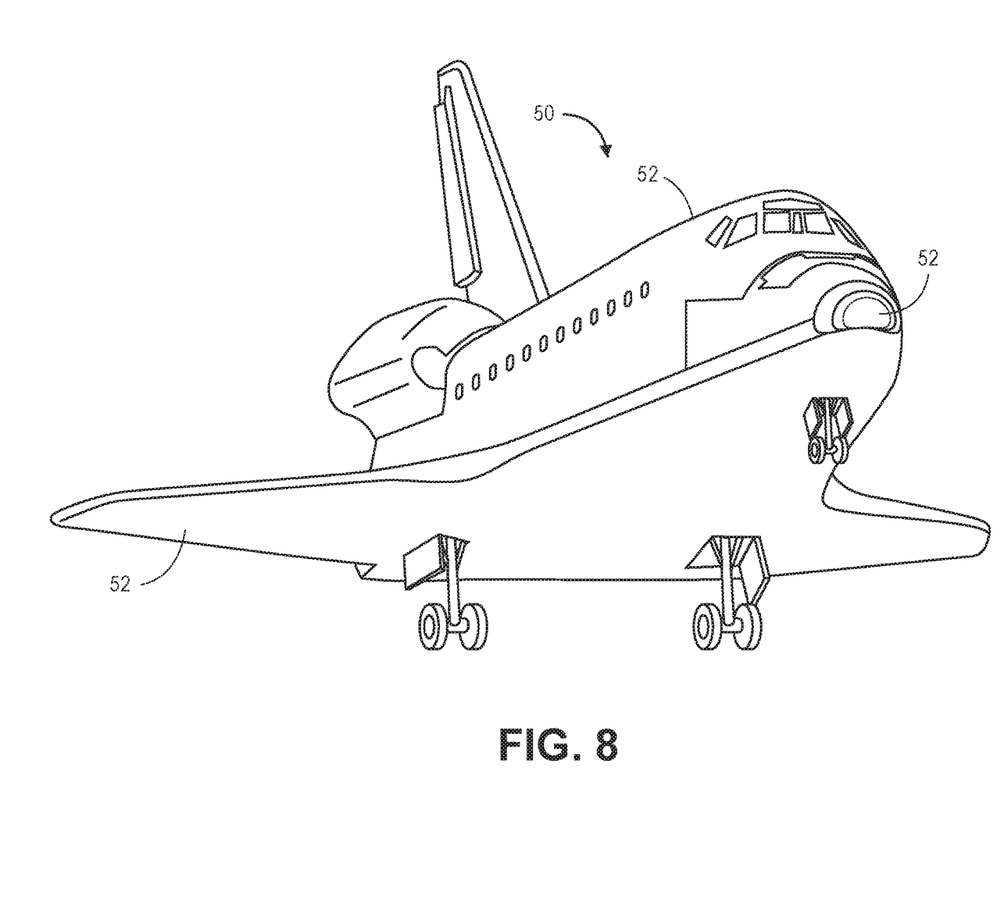
FIG. 8 illustrates a perspective view of a flight vehicle, according to an aspect of the present disclosure.

Referring to FIG. 8, the present disclosure is also directed to a flight vehicle 50. The flight vehicle can comprise a vehicle body base structure and any of the stand-off panel thermal protection systems 1 of the present disclosure coupled to the base structure. The flight vehicle can be, for example, a rocket, an aircraft or a spacecraft, such as a reusable spacecraft. The sandwich panels 10 and the plurality of insulation components positioned between each sandwich panel 10 and the vehicle body base structure can protect the flight vehicle from extreme thermal events, such as may occur upon reentry into the earth's atmosphere or during hypersonic flight.

As can be understood from looking at FIGS. 1 and 8, the second ceramic facesheet 14 of each sandwich panel 10 (shown in FIG. 1) provides a portion of outermost surface 52 (shown in FIG. 8) of the flight vehicle. The plurality of fasteners 24 for each sandwich panel 10 are externally accessible at the outermost surface portion 52 on the flight vehicle, as shown in FIG. 4B.

The ability to install fasteners from the outermost surface of the panel can reduce installation time and/or replacement time and costs. Traditionally, fasteners that attach the TPS system to the vehicle structure have been concealed below the surface to avoid exposure to high temperatures. This requires an access feature, such as a plug or insert, in the panel that covers the fasteners, which can be complex to integrate into the system. An alternative approach involves providing access to fasteners between panels, which makes the integration of a robust sealing concept challenging. The TPS system of the present disclosure simplifies installation by providing fastener access from the outer surface, which can improve overall system reliability and/or reduce installation, maintenance, and repair costs. The use of pre-installed seals 20, as discussed above, can further simplify installation, as the seals 20 are installed as pre-integrated components with the sandwich panels. This removes an additional installation step that has proven to be challenging in alternative designs. The panel design of the present disclosure can also eliminate or reduce the need for certain materials, e.g., waterproofing in some applications.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein.

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including," "includes," "having," "has," "with," or variants thereof are used in either the detailed description and the claims, such terms are intended to be inclusive in a manner similar to the term "comprising." Further, in the discussion and claims herein, the term "about" indicates that the value listed may be somewhat altered, as long as the alteration does not result in nonconformance of the process or structure to the intended purpose described herein. Finally, "exemplary" indicates the description is used as an example, rather than implying that it is an ideal.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompasses by the following claims.

What is claimed is:

1. A flight vehicle fastener comprising:
    a head;
    a shaft attached to the head, the shaft being configured for attachment to a nut, the head and the shaft forming a bolt;
    the nut;
    a reinforcing insert positionable on the shaft, the reinforcing insert comprising a ceramic;
    a washer positionable on the shaft; and
    a nut retainer configured to hold the nut in place when the flight vehicle fastener is used to attach a thermal protection system to a flight vehicle,
    wherein the bolt, nut and washer comprise a whisker-reinforced alumina ceramic matrix composite, and further wherein the flight vehicle fastener has the ability to withstand temperatures of up to 2400° F. without the need for a panel plug to protect the flight vehicle fastener.

2. The flight vehicle fastener of claim 1, wherein the whisker-reinforced alumina ceramic matrix composite comprises SiC whiskers at a concentration of about 30% by weight.

3. The flight vehicle fastener of claim 1, wherein the whisker-reinforced alumina ceramic matrix composite has a melting point of about 3700° F. and a density of about 3.74 g/cc.

4. The flight vehicle fastener of claim 1, wherein the head comprises grooves for receiving tabs of a cup washer locking mechanism, the grooves configured to prevent the flight vehicle fasteners from rotating when the tabs are positioned therein.

5. The flight vehicle fastener system of claim 1, wherein the nut retainer comprises a nickel superalloy metallic material.

6. A method of attaching a thermal protection system to a flight vehicle, the method comprising:
    positioning a plurality of fasteners through a plurality of orifices formed through the thermal protection system, and
    coupling the thermal protection system to the flight vehicle using the plurality of fasteners, the fasteners comprising a ceramic material,
    wherein the fasteners comprise:
        a head;
        a shaft attached to the head, the shaft being configured for attachment to a nut, the head and the shaft forming a bolt;
        the nut;
        a reinforcing insert positionable on the shaft, the reinforcing insert comprising a ceramic;
        a washer positionable on the shaft; and
        a nut retainer configured to hold the nut in place when the fastener is used to attach the thermal protection system to the flight vehicle, wherein the bolt, nut and washer comprise the ceramic material, the ceramic material comprising a whisker-reinforced alumina ceramic matrix composite, and further wherein the fastener has the ability to withstand temperatures of up to 2400° F. without the need for a panel plug to protect the fasteners and without significant degradation in strength and stiffness properties.

7. The method of claim 6, wherein the flight vehicle is a rocket, an aircraft or a spacecraft.

8. The method of claim 6, wherein the whisker-reinforced alumina ceramic matrix composite comprises SiC whiskers at a concentration of about 30% by weight.

9. The method of claim 6, wherein the whisker-reinforced alumina ceramic matrix composite has a melting point of about 3700° F. and a density of about 3.74 g/cc.

10. The method of claim 6, wherein a head of the fasteners comprises grooves for receiving tabs of a cup washer locking mechanism, the method further comprising positioning the tabs of the cup washer into the grooves to prevent the fasteners from rotating.

11. The method of claim 6, wherein the nut retainer comprises a nickel superalloy metallic material.

12. A flight vehicle fastener system comprising:
a head;
a shaft attached to the head, the head and the shaft forming a bolt;
a stand-off bracket positionable on the shaft, the standoff bracket comprising a ceramic;
a washer positionable on the shaft;
a nut configured for attachment to the shaft; and
a nut retainer configured to hold the nut in place when the flight vehicle fastener is used to attach a thermal protection system to a flight vehicle;
wherein the bolt, nut and washer comprise a whisker-reinforced alumina ceramic matrix composite, and further wherein the flight vehicle fastener has the ability to withstand temperatures of up to 2400° F. without the need for a panel plug to protect the flight vehicle fastener.

13. The flight vehicle fastener system of claim 12, wherein the stand-off bracket comprises a ceramic matrix composite material or high temperature metallic material.

14. The flight vehicle fastener system of claim 12, wherein the stand-off bracket comprises alumina.

15. The flight vehicle fastener system of claim 12, wherein the flight vehicle fastener further includes a reinforcing insert positionable on the shaft.

16. The flight vehicle fastener system of claim 12, wherein the whisker-reinforced alumina ceramic matrix composite comprises SiC whiskers at a concentration of about 30% by weight.

17. The flight vehicle fastener system of claim 16, wherein the whisker-reinforced alumina ceramic matrix composite has a melting point of about 3700° F. and a density of about 3.74 g/cc.

18. The flight vehicle fastener system of claim 17, wherein the head comprises grooves for receiving tabs of a cup washer locking mechanism, the grooves configured to prevent the flight vehicle fasteners from rotating when the tabs are positioned therein.

19. The flight vehicle fastener system of claim 12, wherein the whisker-reinforced alumina ceramic matrix composite has a melting point of about 3700° F. and a density of about 3.74 g/cc.

20. The flight vehicle fastener system of claim 12, wherein the nut retainer comprises a nickel superalloy metallic material.

* * * * *